(12) United States Patent
Lundqvist et al.

(10) Patent No.: US 11,999,921 B2
(45) Date of Patent: Jun. 4, 2024

(54) HYDROTHERMAL CARBONIZATION OF SLUDGE INCLUDING RECYCLING OF A WET-OXIDIZED FRACTION

(71) Applicant: C-Green AB, Solna (SE)

(72) Inventors: Fredrik Lundqvist, Ekero (SE); Erik Oden, Stocksund (SE); Fredrik Ohman, Gayle (SE)

(73) Assignee: C-GREEN AB, Solna (SE)

( * ) Notice: Subject to any disclaimer, the term of this patent is extended or adjusted under 35 U.S.C. 154(b) by 256 days.

(21) Appl. No.: 16/954,288

(22) PCT Filed: Dec. 11, 2018

(86) PCT No.: PCT/SE2018/051290
§ 371 (c)(1),
(2) Date: Jun. 16, 2020

(87) PCT Pub. No.: WO2019/125274
PCT Pub. Date: Jun. 27, 2019

(65) Prior Publication Data
US 2021/0087093 A1  Mar. 25, 2021

(30) Foreign Application Priority Data
Dec. 21, 2017 (SE) .................................. 1751622-0

(51) Int. Cl.
*C10L 9/08* (2006.01)
*C02F 11/08* (2006.01)
(Continued)

(52) U.S. Cl.
CPC ............... *C10L 9/086* (2013.01); *C02F 11/08* (2013.01); *C02F 11/13* (2019.01); *C02F 11/18* (2013.01);
(Continued)

(58) Field of Classification Search
None
See application file for complete search history.

(56) References Cited

U.S. PATENT DOCUMENTS 3,649,534 A * 3/1972 Schotte ................... C02F 11/08
                                          210/761
3,803,806 A * 4/1974 Komline, Sr. .......... C02F 9/00
                                          96/240
(Continued)

FOREIGN PATENT DOCUMENTS

DE  102010062833 B3  6/2012
EP  2206688 A1  7/2010
(Continued)

OTHER PUBLICATIONS

Reza et al., Wet Air Oxidation of Hydrothermal Carbonization (HTC) Process Liquid, 4 ACS Sustain. Chem. Eng. 3250, 3251-52 (2016). (Year: 2016).*
(Continued)

*Primary Examiner* — Claire A Norris
(74) *Attorney, Agent, or Firm* — Stites & Harbison PLLC; Richard S. Myers, Jr.

(57) ABSTRACT

There is provided a method of hydrothermal carbonization of a sludge, comprising the steps of: preheating the sludge to obtain a preheated sludge; mixing the preheated sludge with a wet-oxidized fraction to obtain a reaction mixture; subjecting the reaction mixture to hydrothermal carbonization (HTC) in a reactor to obtain a HTC-treated sludge; separating a fraction from the HTC-treated sludge; and mixing the fraction with an oxidizing agent, such as oxygen gas, to obtain the wet-oxidized fraction, wherein the temperature of the fraction before the wet oxidation is at least 15° C. higher than the temperature of the preheated sludge. A corresponding system is also provided.

13 Claims, 4 Drawing Sheets

(51) Int. Cl.
    *C02F 11/13*     (2019.01)
    *C02F 11/18*     (2006.01)
    *C02F 103/34*     (2006.01)

(52) U.S. Cl.
    CPC ...... *C02F 2103/34* (2013.01); *C02F 2209/08* (2013.01)

(56) References Cited

U.S. PATENT DOCUMENTS

| | | | | |
|---|---|---|---|---|
| 4,017,421 | A | * | 4/1977 | Othmer ............ C02F 1/02 210/918 |
| 5,279,637 | A | * | 1/1994 | Lynam ............ F26B 25/005 165/92 |
| 2011/0056125 | A1 | * | 3/2011 | Antonietti ............ C10L 9/00 44/605 |
| 2011/0272350 | A1 | * | 11/2011 | Skillicorn ............ C02F 11/02 210/616 |
| 2012/0103040 | A1 | | 5/2012 | Wolf et al. |

FOREIGN PATENT DOCUMENTS

| | | |
|---|---|---|
| WO | WO2009127727 A1 | 1/2010 |
| WO | WO2017003358 A1 | 1/2017 |

OTHER PUBLICATIONS

Baskyr, et al., Wet oxidation of char-water-slurries from hydrothermal carbonization of paper and brewer's sprent grains, Fuel Processing Technology 128 (2014), pp. 425-431.

Gotthart Riedel et al: Combination of hydrothermal carbonization and wet oxidation of various biomasses, Chemical Engineering Journal 279 (2015) pp. 715-724.

M. Toufiq Reza et al: Wet air oxidation of hydrothermal carbonization (HTC) process liquid, ACS Sustainable Chem. Eng. 2016, 4, 3250-3254, published May 14, 2016.

* cited by examiner

HYDROTHERMAL CARBONIZATION OF SLUDGE INCLUDING RECYCLING OF A WET-OXIDIZED FRACTION

CROSS REFERENCE TO RELATED APPLICATIONS

This application is a § 371 National State Application of PCT/SE2018/051290 filed Dec. 11, 2018, which claims priority to SE 1751622-0 filed Dec. 21, 2017.

TECHNICAL FIELD

The present disclosure relates to a method of hydrothermal carbonization of sludge, in particular municipal or industrial sludge from a wastewater treatment plant.

BACKGROUND

Sludge is typically what remains after wastewater treatment in municipal or industrial wastewater treatment plants. Municipal wastewater treatment plants treat wastewater from cities while industrial wastewater treatment plants treat water effluents from different industrial processes, for example pulp and paper mills, industrial food production facilities etc. Animal farming is also a considerable source of wastewater and sludge, for example large-scale pig farming. Embodiments of the present disclosure will be useful in all these areas.

The technologies for wastewater treatment are similar on a general level, but include specific solutions depending on the character of the waste streams to be treated, basic design, local requirements and environmental concerns. In larger plants in Sweden, the wastewater treatment process often comprises mechanical pretreatment followed by primary (settling) and secondary (aerobic) treatment steps. In some cases different forms of tertiary treatment is also applied to remove remaining problematic substances, for example drug residues, toxic organic substances etc., in the treated water. In smaller plants one or more of these stages may often be omitted.

Almost all wastewater treatment plants in use generate sludge that needs to be handled. The sludge is either recovered directly from the plant after dewatering (aerobic sludge) or first treated anaerobically for biogas production where part of the sludge is digested and the remainder is recovered as anaerobic sludge.

Wastewater treatment plants world wide produce several hundred millions metric tonnes of sludge every year and the amount is rapidly growing. In Sweden, the total sludge volume in tons of dry solids per year (tDS/y) was reported to be 250 000 in 2010 and the current figure is estimated to be the same or higher. Sludge handling is thus an enormous challenge for society, and present solutions are associated with high cost and frequently also a negative environmental impact.

Starting from 1986, the European Union has adopted several directives regulating the treatment and disposal of waste water sludge, addressing different aspects such as the use of sludge as landfill, the recovery of phosphorus, incineration of sludge etc. The various directives are reflected in national legislation in the individual member states, and for example in Sweden, the disposal of sludge in landfill has been prohibited since 2005.

Today, the main uses for wastewater sludge are fertilization in agriculture and forestry/silviculture, mixing into plant soil for ground construction projects and the coverage and restoration of landfills, incineration with energy recovery, recovery of chemicals and the production of fertilizers, and finally landfill, however provided that the sludge has undergone specific pretreatment, such as composting.

Incineration of the sludge, with energy recovery and suitable treatment of flue gases and ashes to destroy harmful chemicals and safely handle heavy metals, remains an attractive alternative. The exact composition of the sludge however depends on the composition of the incoming wastewater and the type of wastewater treatment plant. Sludge with high concentrations of organic and/or biological components is generally difficult to dewater. The water content is frequently so high that the net heating value if incinerated in a power plant is very low or even negative and the addition of support fuels, often fossil fuel, may be necessary.

C-Green Technology AB has developed a process for treatment of sludge involving a step of hydrothermal carbonization (HTC). Phosphorus can be extracted either from the biofuel before combustion or from ash after combustion.

SUMMARY

The operation of many hydrothermal carbonization (HTC) systems require a supply of external energy, e.g. in the form of electricity or gas. The present inventors have found that the need for continuous supply of external energy in HTC treatment of sludge can be eliminated by subjecting a fraction of the HTC-treated sludge to wet oxidation and then recirculating the wet-oxidized fraction to recover the heat released to by the oxidation. A benefit of carrying out wet-oxidation on sludge that has already undergone HTC treatment is that the HTC treatment increases the chemical oxygen demand (COD) of the sludge and higher COD means more fuel for the wet oxidation process. Further, the HTC-treated sludge has a higher temperature than incoming or preheated sludge and the higher temperature results in a faster wet oxidation process, which is temperature-dependent. At temperatures above 120° C., a higher temperature also increases the solubility of oxygen gas in the sludge, which further facilitates the wet oxidation (when oxygen gas is the oxidation agent).

As a first aspect of the present disclosure, there is thus provided a method of hydrothermal carbonization of a sludge, comprising the steps of:

preheating the sludge to obtain a preheated sludge;
mixing the preheated sludge with a wet-oxidized fraction to obtain a reaction mixture;
subjecting the reaction mixture to hydrothermal carbonization (HTC) in a reactor to obtain a HTC-treated sludge;
separating a fraction from the HTC-treated sludge; and
mixing the fraction with an oxidizing agent to obtain the wet-oxidized fraction.

The oxidizing agent is preferably oxygen gas. "Oxygen gas" refers to a gas comprising at least 80% oxygen by volume, preferably at least 95% oxygen by volume. Consequently, "adding oxygen gas" in step b) does not cover adding air (as the oxygen content of air is only 21% by volume). A benefit of using oxygen gas instead of air is that less inert gas is added to the reactor. Another benefit is a more efficient wet oxidation reaction As understood by the skilled person, the method is a continuous method.

The sludge of the present disclosure is preferably a municipal or industrial sludge from a wastewater treatment plant.

The dry solids content (also referred to as "Total Solids") of the sludge is typically 1-35%, such as 2-35%, such as 3-32%. If the sludge is anaerobic sludge, the dry solids content is normally 13-32%. If the sludge is aerobic sludge, the dry solids content is typically 5-15%. The ash content is typically 10-75%, such as 12-50%, such as 30-50%, of the dry weight of the sludge. The higher heating value (HHV) of the sludge is typically 3.5-21 MJ/kg, such as 6-17 MJ/kg (dry weight).

The wet oxidation of the present disclosure does typically not consume the whole HHV of the sludge. Normally it consumes less than 50% of the HHV of the sludge and preferably it consumes 5-20%, such as 6-15%, of the HHV of the sludge. The amount of oxidation agent added in the method may be adapted accordingly.

The present disclosure facilitates the separation of phosphorus (P). Accordingly, the sludge of the present disclosure preferably comprises phosphorus, e.g. in an amount of 0.5-9% of the dry weight of the sludge, such as 1-9% of the dry weight of the sludge, such as 1.5-9% of the dry weight of the sludge.

Further, the treated sludge is used as a fuel for the wet-oxidation process. The final HTC coal is also typically used as a fuel. Therefore, the sludge of the present disclosure preferably comprises carbon (C), e.g. in an amount of 9-46% of the dry weight of the sludge, such as 20-46% of the dry weight of the sludge.

The wet oxidation of the present disclosure does not require a separate reactor. Instead, it is sufficient that the fraction is mixed with the oxidation agent, e.g. using an oxygen gas mixer. Accordingly, in one embodiment of the first aspect, no reactor separate from the above-mentioned reactor for the HTC is used for the reaction between the oxidizing agent and the fraction. To achieve better process control, it may however be beneficial to allow the wet-oxidized fraction to pass through a reactor before it is mixed with the preheated sludge. The retention time in such a reactor may for example be 10-60 min, such as 20-40 min. The volume of such a reactor may for example be 10-50%, such as 20-40% of the volume of the reactor for the HTC.

When the oxidizing agent is oxygen gas, it may be added in an amount of 60-260 kg per tonne of dry sludge processed by the method, preferably 100-200 kg per tonne of dry sludge processed by the method, more preferably 110-150 kg per tonne of dry sludge processed by the method.

According to one embodiment, the fraction is a particle-lean fraction, which means that its total suspended solids (TSS) content is lower than the TSS content of the HTC treated sludge. For example, the TSS content of the particle-lean fraction may be lower than 50 g/l, preferably lower than 30 g/l, more preferably lower than 20 g/l.

A benefit of a relatively low TSS content in the fraction is that the blending of the oxidation agent, such as oxygen gas, in the fraction is improved.

Heavy metals and phosphorus tend to be bound by the solid particles of the sludge and there is a risk that the wet oxidation processes releases such substances to the liquid. Another benefit of a relatively low TSS content in the fraction (which is subjected to wet oxidation) is thus that such release is minimized.

The method may comprise obtaining a second fraction from the HTC-treated sludge.

The second fraction may be a particle-rich fraction, which means that its TSS content is higher than the TSS content of the fraction that is mixed with the oxidizing agent.

HTC-treated sludge may be separated into the particle-lean fraction and the particle rich fraction in a separator arranged downstream the reactor. The skilled person knows how to carry out such a separation.

Alternatively, the reactor may be provided with a first outlet for the particle-lean fraction and a second outlet for the particle-rich fraction. In such case, the first outlet is arranged above the second outlet such that sedimentation and/or fluidization can be used for the separation. A reactor designed to enable fluidization-based separation is described below with reference to FIGS. 1a and 1b.

The second fraction may be cooled by flashing. Such flashing provides at least one steam fraction that is/are preferably used in the preheating step. In one embodiment, the flashing provides at least two, such as at least three, steam fractions of different temperatures that are used for sequential heating of the sludge in the preheating step.

The temperature of the HTC-treated sludge (i.e. sludge at an outlet of the reactor) is typically 180-250° C. and preferably 180-230° C. More preferably, it is 190-225° C.

The step of wet oxidation is carried out as the preheating is not sufficient for the sludge to reach the temperature of the HTC treatment in the reactor. The temperature of the HTC-treated sludge is normally at least 20° C. higher (such as 20-65° C. higher) and preferably at least 30° C. higher (such as 30-65° C. higher) than the temperature of the preheated sludge that is mixed with the wet-oxidized fraction.

The average retention time in the reactor is typically 0.25-8 h and preferably 0.5-2 h.

Preferably, the volumetric flow rate of the fraction is 10-50% of the volumetric flow rate of the preheated sludge.

To provide enough fuel for the wet oxidation process, the chemical oxygen demand (COD) of the fraction is typically at least 15 g/l, preferably at least 20 g/l, more preferably at least 30 g/l, and most preferably at least 40 or 50 g/l.

It is generally considered to be more practical to mix the preheated sludge with the wet-oxidized fraction in a position upstream the reactor, such as in a pipe leading to the reactor, than in the reactor.

In a preferred embodiment, the preheated sludge is thus mixed with the wet-oxidized fraction in a position upstream the reactor. Examples of such an embodiment are shown in FIGS. 1a and 2a.

In an alternative embodiment, the preheated sludge is mixed with the wet-oxidized fraction in the reactor. Examples of such an embodiment are shown in FIGS. 1b and 2b.

As mentioned above, a benefit of adding the oxidizing agent to the fraction of the HTC-treated sludge instead of to the preheated sludge is that the temperature of the fraction is higher. The temperature of the fraction before the wet oxidation (i.e. before it is mixed with the oxidizing agent) is for example at least 15° C. higher (such as 15-65° C. higher), preferably at least 20° C. higher (such as 20-65° C. higher) and more preferably at least 25° C. higher (such as 25-65° C. higher) than the temperature of the preheated sludge.

Further embodiments of the first aspect may be derived from the discussion about the second aspect below.

As a second aspect of the present disclosure, there is provided a system for hydrothermal carbonization of a sludge, comprising:
  an inlet for receiving sludge;
  a reactor for subjecting sludge to a hydrothermal carbonization (HTC) such that HTC-treated sludge is obtained;
  a routing arrangement for routing sludge from the inlet to the reactor, which arrangement comprises a preheating arrangement; and a recirculation arrangement for routing a first fraction of the HTC-treated sludge to a position on the routing arrangement between the preheating arrangement and the reactor or to the reactor, which recirculation arrangement comprises a mixer for mixing the first fraction with an oxidizing agent, such as oxygen gas.

As understood by the skilled person, the recirculation arrangement is connected to an outlet of the reactor.

The action of the mixer results in that the first fraction of the HTC-treated sludge becomes a "wet-oxidized fraction".

Examples of a recirculation arrangement for routing the fraction to a position on the routing arrangement between the preheating arrangement and the reactor are shown in FIGS. 1a and 2a. According to such examples, the wet-oxidized fraction is mixed/merged with preheated sludge upstream the reactor, but downstream the preheating arrangement.

It follows from the discussion above that the routing arrangement may comprise a T-type connection or another mixing device arranged downstream the preheating arrangement. In such case, the routing arrangement is connected to the T-type connection of mixing device.

Examples of a recirculation arrangement for routing the fraction to the reactor are shown in FIGS. 1b and 2b. According to such examples, the wet-oxidized fraction is mixed with preheated sludge in the reactor.

Routing the fraction to a position on the routing arrangement between the preheating arrangement and the reactor enables practical mixing and it thus more preferred than routing the fraction to the reactor.

As understood by the skilled person, the system is adapted for a continuous process and the reactor is a continuous reactor.

The oxidizing agent is preferably oxygen gas and the mixer is preferably an oxygen gas mixer. Other types of oxidizing equipment, such as counter- or concurrent flow reactors or absorption towers can also be used.

The system may further comprise:
a flashing arrangement for subjecting a second fraction of HTC-treated sludge to flashing to obtain a cooled second fraction and at least one steam fraction; and
a steam routing arrangement for routing the at least one steam fraction to the preheating arrangement.

The flashing arrangement may comprise at least two, such as at least three, flashing vessels arranged in series to provide steam fractions of different temperatures. Further, the preheating arrangement may comprise at least two, such as at least three, steam mixers arranged in series. The steam routing arrangement preferably connects the flashing vessels to the steam mixers such that the sludge can be preheated stepwise.

The steam mixer(s) may be venturi mixer(s).

In one embodiment, the reactor comprises a first outlet for the first fraction and a second outlet for the second fraction, wherein the first outlet is arranged above the second outlet. Such an reactor may comprise: a reactor inlet arranged at the top of the reactor, which inlet is connected to the routing arrangement; a first channel extending downwardly from the reactor inlet for guiding material from the inlet to a bottom section of the reactor; a second channel extending upwardly from the bottom section to the first outlet, which is connected to the recirculation arrangement; and the second outlet, which may be connected to the flashing arrangement.

As mentioned above, the wet oxidation of the present disclosure does not require a separate reactor. In one embodiment of the second aspect, there is thus no reactor arranged in recirculation arrangement downstream the mixer for mixing the first fraction with the oxidizing agent.

Otherwise, the embodiments of the first aspect apply to the second aspect mutatis mutandis.

DETAILED DESCRIPTION

Figure 1A:
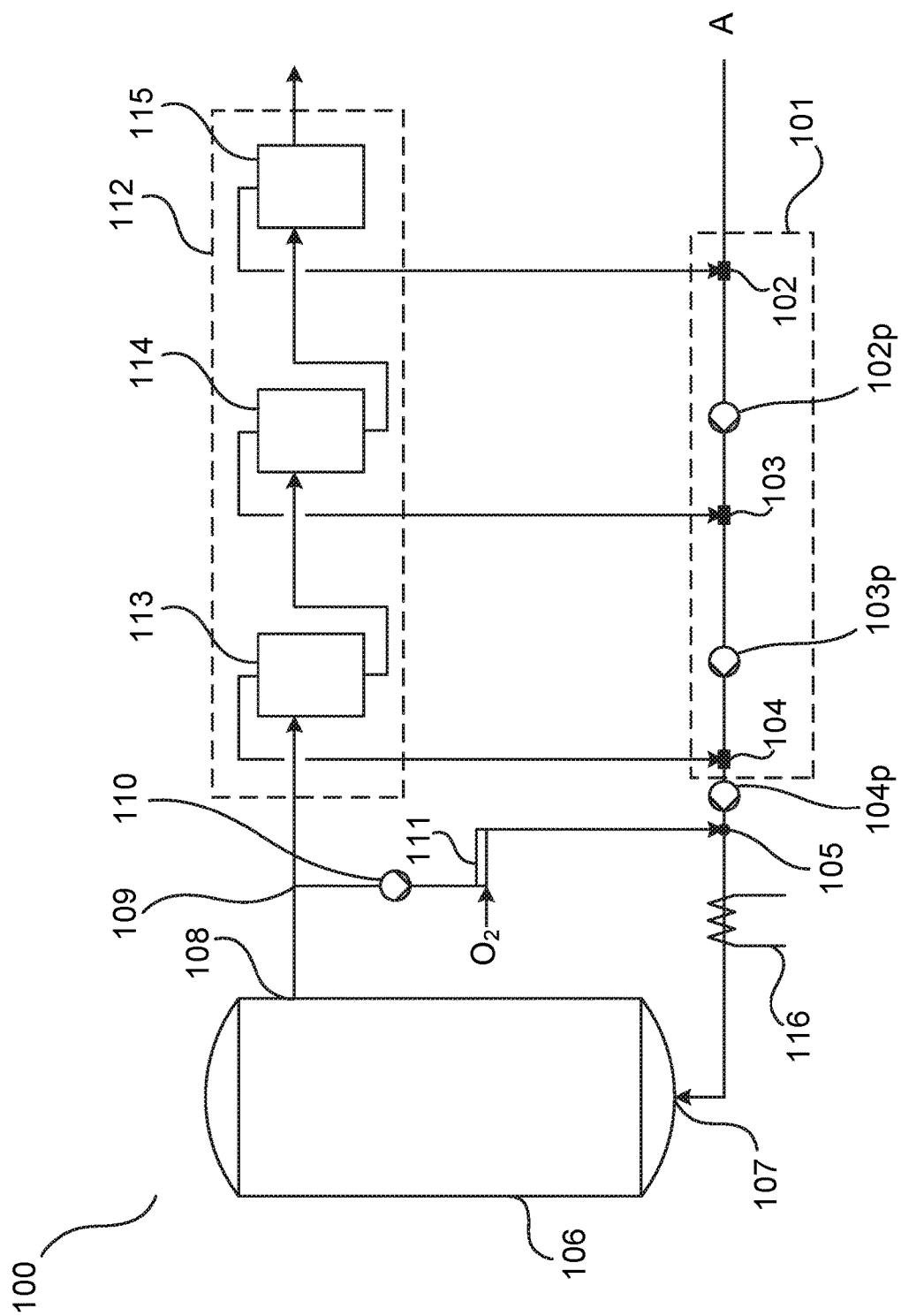
FIGS. 1a, 1b, 2a and 2b illustrate different exemplary embodiments of a system for sludge treatment according to the present disclosure.

A first exemplary embodiment of a system 100 according to the present disclosure is schematically illustrated in FIG. 1a. For the process in the system, a sludge is received (A) from a source, which can be a municipal wastewater treatment plant, an industrial process, or an installation in agriculture or animal farming. The sludge may be received directly from the plant or from a storage tank that forms part of the system. The sludge typically has an initial temperature of about 30° C. and a dry matter content of about 30%. After optional initial heating (not shown), e.g. by a liquid stream from the same process/system, the sludge is preheated in a preheating arrangement 101. The preheating is preferably carried out by stepwise additions of steam, e.g. in a first 102, a second 103 and a third 104 steam mixer arranged in series. Downstream each steam mixer 102, 103, 104, a pump 102p, 103p, 104p is arranged. The last pump brings the pressure up to the pressure of the HTC reaction discussed below. After the preheating arrangement 101, a preheated sludge having a temperature of about 175° C. is obtained. In a T-type connection 105 (or a more advanced device for mixing two flows), the preheated sludge is merged with a wet-oxidized fraction to form a reaction mixture, which is fed to a vertical reactor 106, preferably through an inlet 107 arranged at the bottom of the reactor 106. In the reactor 106, the reaction mixture undergoes hydrothermal carbonization (HTC). The temperature of the sludge may vary between different positions in the reactor 106 because of exothermic reactions (e.g. the HTC reactions and the wet oxidation discussed below) and heat losses. A HTC treated sludge is withdrawn from the reactor 106, preferably through an outlet 108 arranged at a top section of the reactor 106. The temperature of the heat treated sludge is 200-215° C. when it is withdrawn from the reactor 106.

A fraction is separated 109 from the HTC-treated sludge. The pressure of the fraction is increased slightly by a pump no. Oxygen gas is then added to the fraction in an oxygen gas mixer in such that the "wet-oxidized fraction" is obtained. The oxygen gas mixer is connected to an oxygen tank (not shown). The amount of oxygen gas may be about 130 kg per tonne of dry sludge processed in the system. The wet oxidation is not instantaneous. Rather, it will be ongoing when the fraction flows downstream the oxygen gas mixer 111 and possibly also after the merge with the preheated sludge.

The volumetric flow rate of the fraction is 10-50% of the volumetric flow rate of the preheated sludge.

The remaining HTC-treated sludge forms a second fraction that instead of being recirculated is subjected to flashing in a flashing arrangement 112, which produces at least one steam fraction that is used to preheat the sludge in the preheating arrangement 101. Preferably, the flashing arrangement 112 comprises several flashing vessels arranged in series to produce steam fractions of different temperatures. For example, the flashing arrangement 112 may comprise: a first flashing vessel 113 that produces a steam fraction of relatively high temperature that is routed to the third steam mixer 104 of the preheating arrangement 101; a second flashing vessel 114 that produces a steam fraction of medium temperature that is routed to the second steam mixer 103 of the preheating arrangement 101; and a third flashing vessel 115 that produces a steam fraction of relatively low temperature that is routed to the first steam mixer 102 of the preheating arrangement 101.

The cooled slurry obtained downstream the flashing arrangement 112 is dewatered (not shown) such that at least one liquid stream (that can be used for initial heating and/or dilution of incoming sludge) and a thick fraction comprising HTC coal are obtained.

The system 100 may comprise a heater 116 using external heat, such as an electrical heater, for cold starting the process. The heater 116 is preferably arranged downstream the merging point 105, but upstream the reactor 106.

Figure 1B:
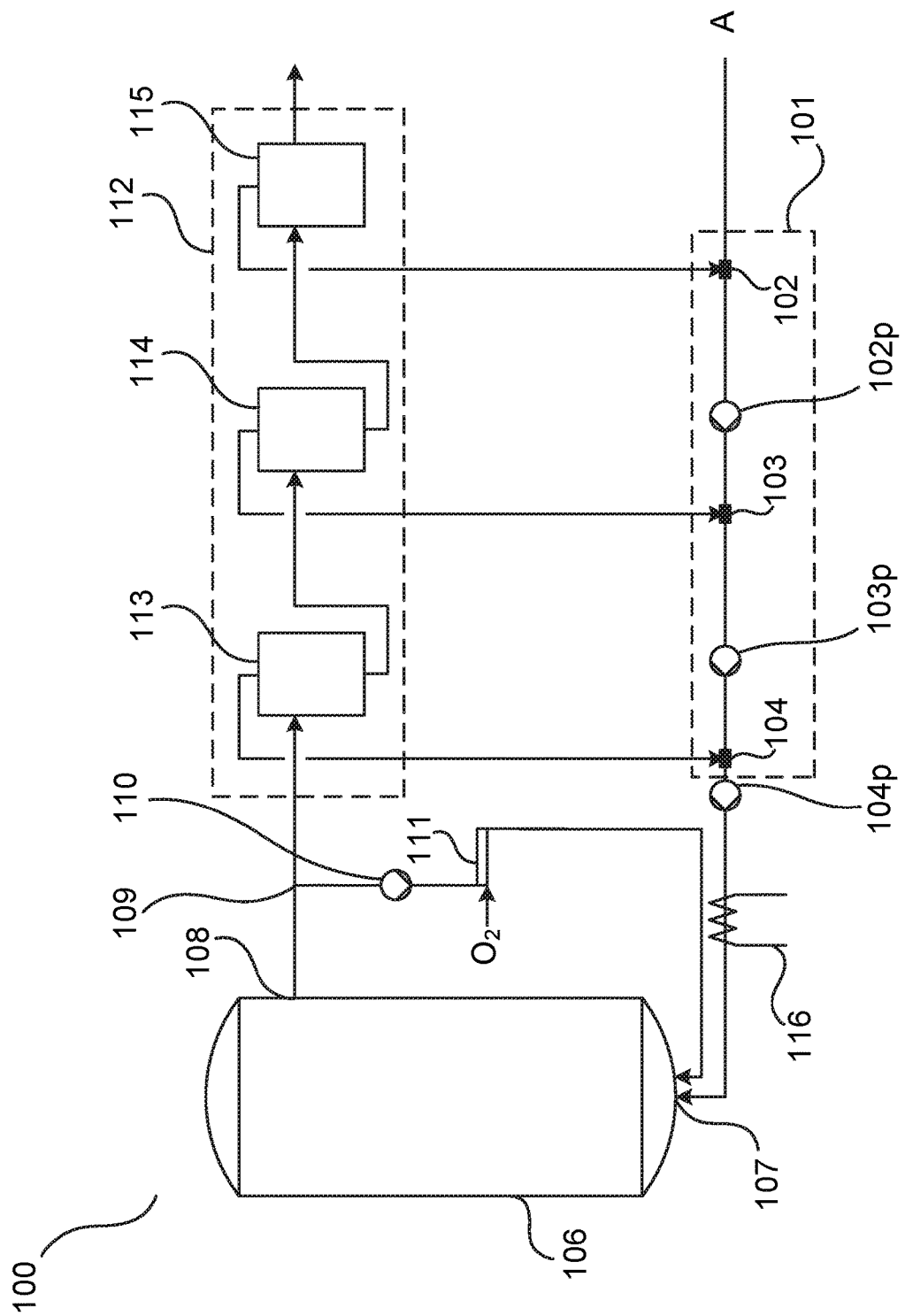

A variant of the first exemplary embodiment is illustrated in FIG. 1b. The difference between FIG. 1b and FIG. 1a is that the wet-oxidized fraction is not merged with the preheated sludge in a position upstream the reactor 106. In FIG. 1b, the wet-oxidized fraction and the preheated sludge are instead separately added to an upstream portion of the reactor 106 and thus mixed in the reactor 106 to form the reaction mixture.

Figure 2A:
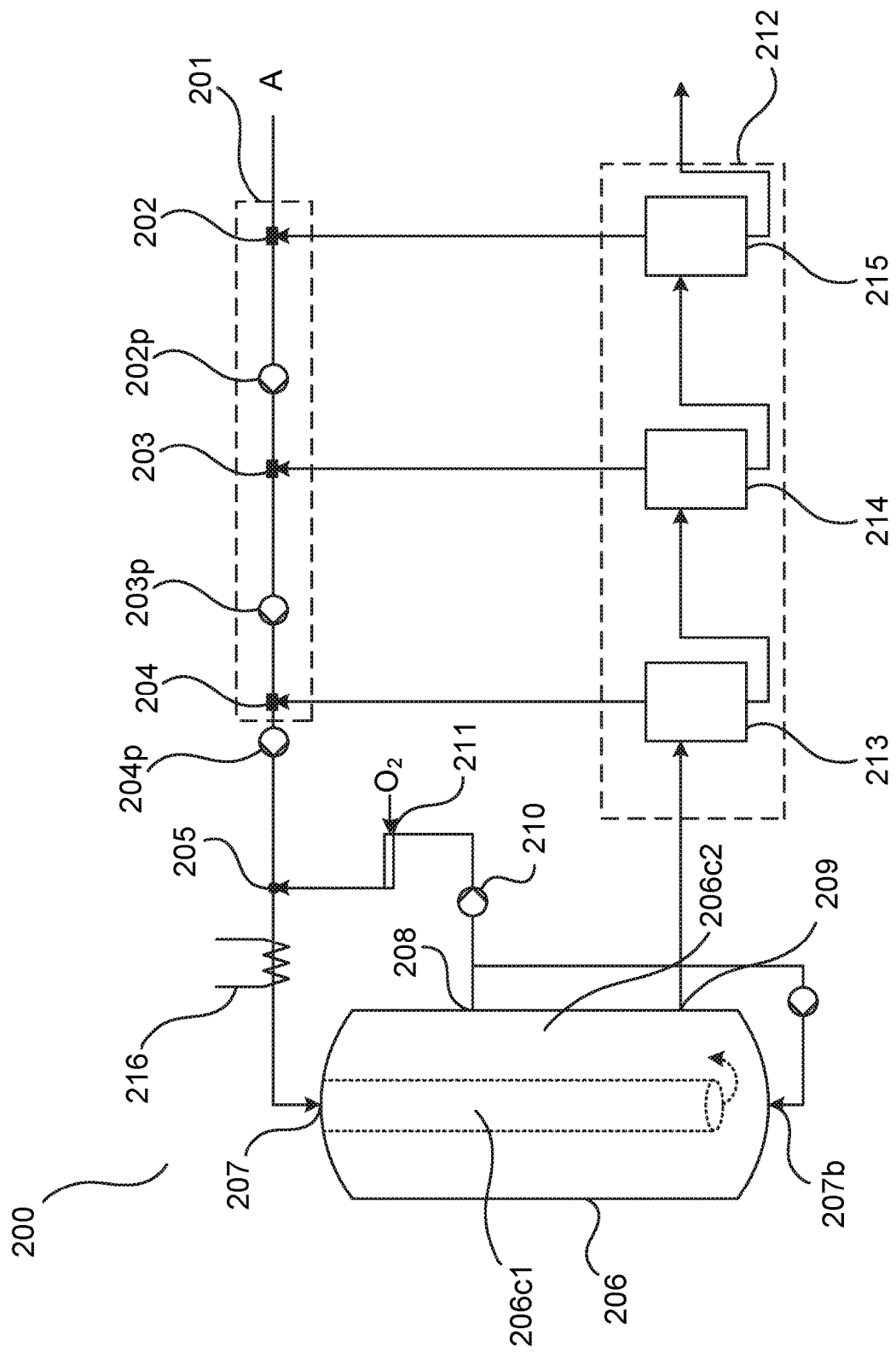

A second exemplary embodiment of a system 200 according to the present disclosure is schematically illustrated in FIG. 2a. For the process in the system 200, a sludge is received (A) from a source, which can be a municipal wastewater treatment plant, an industrial process, or an installation in agriculture or animal farming. The sludge may be received directly from the plant or from a storage tank that forms part of the system. The sludge typically has an initial temperature of about 30° C. and a dry matter content of about 30%. After optional initial heating (not shown), e.g. by a liquid stream from the same process/system, the sludge is preheated in a preheating arrangement 201. The preheating is preferably carried out by stepwise additions of steam, e.g. in a first 202, a second 203 and a third 204 steam mixer arranged in series. Downstream each steam mixer 202, 203, 204, a pump 2o2p, 2o3p, 2o4p is arranged. The last pump brings the pressure up to the pressure of the HTC reaction discussed below. After the preheating arrangement 201, a preheated sludge having a temperature of about 175° C. is obtained. In a T-type connection 205 (or a more advanced device for mixing two flows), the preheated sludge is merged with a wet-oxidized fraction to form a reaction mixture, which is fed to a vertical reactor 206, in which the reaction mixture is subjected to hydrothermal carbonization (HTC) and the HTC-treated sludge is separated into a particle-lean fraction and a particle-rich fraction. The reactor 206 comprises: a reactor inlet 207 arranged at the top of the reactor 206; a first channel 206c1 extending downwardly from the reactor inlet 207 for guiding the reaction mixture from the inlet 207 to a bottom section of the reactor 206; a second channel 206c2 extending upwardly from the bottom section to a recirculation outlet 208 for withdrawing the particle-lean fraction; and a lower outlet 209 for withdrawing the particle-rich fraction. The design of the reactor 206 enables fluidization that facilitates the separation into the particle-lean fraction and the particle-rich fraction (see patent application SE 1750284 A1).

Preferably, part of the particle-lean stream is recirculated to a bottom inlet 207b of the reactor 206. A flow through such a bottom inlet aids the fluidization.

Oxygen gas is added to the other part of the particle-lean fraction or to all of it in case the recirculation to the bottom inlet is omitted. By the oxygen addition, the "wet-oxidized fraction" is obtained. The addition is made by means of an oxygen gas mixer 211, which is connected to an oxygen tank (not shown). The amount of oxygen gas may be about 130 kg per tonne of dry sludge processed in the system. The wet oxidation is not instantaneous. Rather, it will be ongoing when the fraction flows downstream the oxygen gas mixer 211 and possibly also after the merge with the preheated sludge. Before the oxygen gas mixer 211, the pressure of the particle-lean fraction is increased slightly by a pump 210.

The volumetric flow rate of the wet-oxidized fraction is 10-50% of the volumetric flow rate of the preheated sludge.

The temperature varies slightly between different positions in the reactor 206 because of exothermic reactions (e.g. the HTC reactions and the wet oxidation) and heat losses. The particle-lean fraction and the particle-rich fraction have a temperature within the range of 200-215° C. when they are withdrawn from the reactor 206.

The particle-rich fraction is subjected to flashing in a flashing arrangement 212, which produces at least one steam fraction that is used to preheat the sludge in the preheating arrangement 201. Preferably, the flashing arrangement 212 comprises several flashing vessels arranged in series to produce steam fractions of different temperatures. For example, the flashing arrangement 212 may comprise: a first flashing vessel 213 that produces a steam fraction of relatively high temperature that is routed to the third steam mixer 204 of the preheating arrangement 201; a second flashing vessel 214 that produces a steam fraction of medium temperature that is routed to the second steam mixer 203 of the preheating arrangement 201; and a third flashing vessel 215 that produces a steam fraction of relatively low temperature that is routed to the first steam mixer 202 of the preheating arrangement 201.

The cooled slurry obtained downstream the flashing arrangement 212 is dewatered (not shown) such that at least one liquid stream (that can be used for initial heating and/or dilution of incoming sludge) and a thick fraction comprising HTC coal are obtained.

The system 200 may comprise a heater 216 using external heat, such as an electrical heater, for cold starting the process. The heater 216 is preferably arranged downstream the merging point 205, but upstream the reactor 206.

Figure 2B:
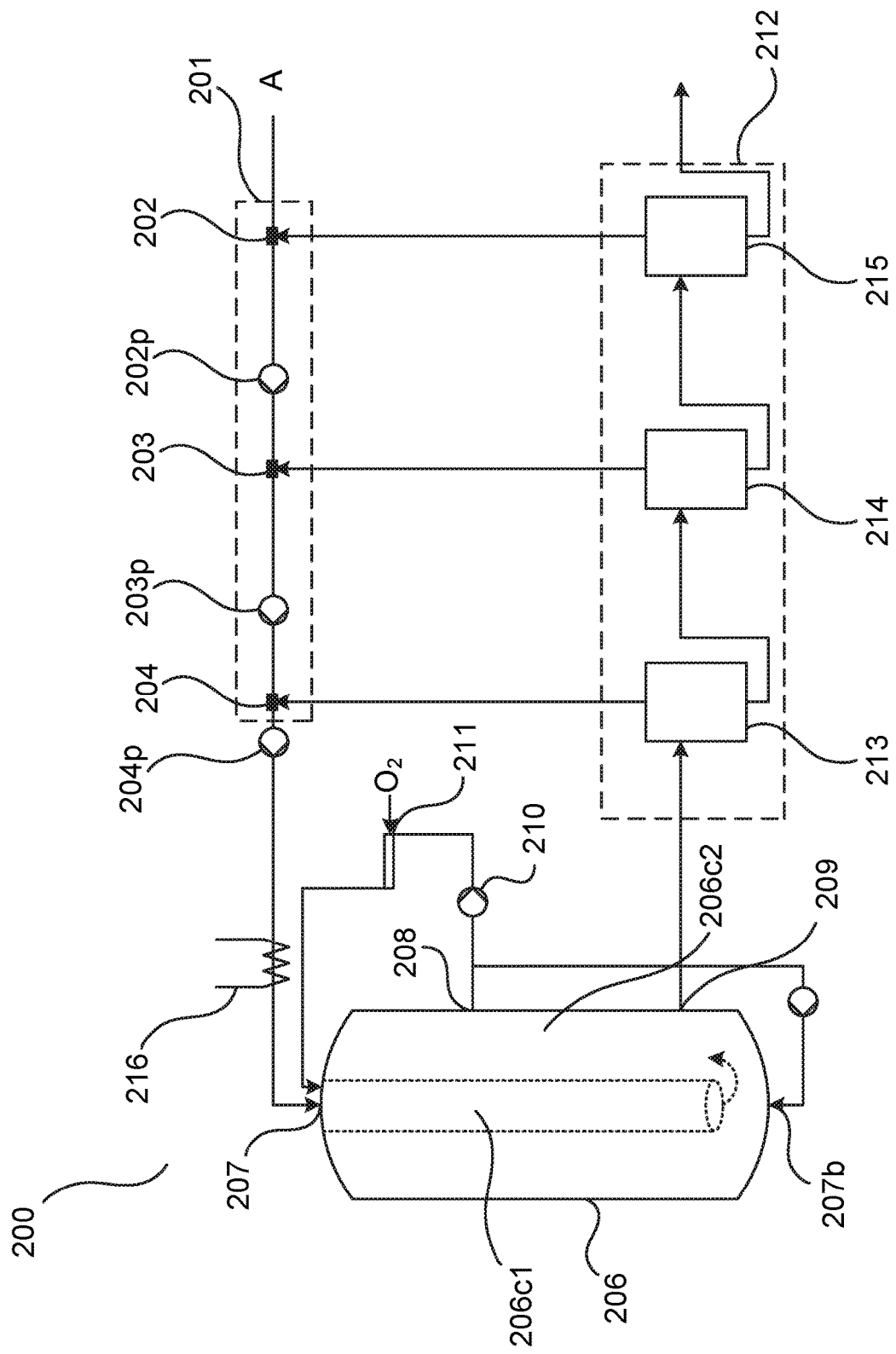

A variant of the second exemplary embodiment is illustrated in FIG. 2b. The difference between FIG. 2b and FIG. 2a is that the wet-oxidized fraction is not merged with the preheated sludge in a position upstream the reactor 206. In FIG. 1b, the wet-oxidized fraction and the preheated sludge are instead separately added to an upstream portion of the reactor 206 and thus mixed in the reactor 206 to form the reaction mixture.

The invention claimed is:

1. A method of hydrothermal carbonization of a sludge, comprising the steps of:
   preheating the sludge to obtain a preheated sludge;
   mixing the preheated sludge with a recirculated wet-oxidized fraction to obtain a reaction mixture;
   subjecting the reaction mixture to hydrothermal carbonization (HTC) in a reactor to obtain an HTC-treated sludge;
   separating the HTC-treated sludge into first and second HTC-treated sludge fractions;
   mixing the separated first HTC-treated sludge fraction with an oxidizing agent to obtain a wet-oxidized fraction; and recirculating the wet-oxidized fraction to be mixed with the preheated sludge;

wherein a temperature of the first HTC-treated sludge fraction before the wet oxidation is at least 15° C. higher than the temperature of the preheated sludge.

2. The method according to claim 1, further comprising subjecting the second fraction to flashing to obtain at least one steam fraction and a cooled fraction, wherein the at least one steam fraction is recirculated for use in the preheating step.

3. The method according to claim 1, wherein the sludge is a municipal or industrial sludge from a wastewater treatment plant.

4. The method according to claim 1, wherein the temperature of the HTC-treated sludge is 180-250° C.

5. The method according to claim 1, wherein the temperature of the HTC-treated sludge is at least 20° C. higher than the temperature of the preheated sludge prior to it being mixed with the wet-oxidized fraction.

6. The method according to claim 1, wherein the average retention time in the reactor is 0.25-8 h.

7. The method according to claim 1, wherein the volumetric flow rate of the first fraction is 10-50% of the volumetric flow rate of the preheated sludge.

8. The method according to claim 1, wherein the chemical oxygen demand (COD) of the first fraction is at least 15 g/l.

9. The method according to claim 1, wherein preheated sludge is mixed with the wet-oxidized fraction in the reactor.

10. The method according to claim 1, wherein preheated sludge is mixed with the wet-oxidized fraction in a position upstream the reactor.

11. The method according to claim 1, wherein the temperature of the first fraction before the wet oxidation is at least 20° C. higher than the temperature of the preheated sludge.

12. The method according to claim 1, wherein the amount of oxidizing agent is such that wet oxidation reactions reduces the higher heating value (HHV) of the sludge by 5-49%.

13. The method of claim 1, wherein the oxidizing agent is oxygen gas.

* * * * *